United States Patent [19]

Sury et al.

[11] Patent Number: 4,798,019
[45] Date of Patent: Jan. 17, 1989

[54] PORTABLE BLIND

[76] Inventors: Patty A. Sury, 5722 Second, NW.; James E. Wilkins, 171 Vineyard, NW., both of Albuquerque, N. Mex. 87107

[21] Appl. No.: 153,990
[22] Filed: Feb. 9, 1988
[51] Int. Cl.[4] .......................................... A01M 31/00
[52] U.S. Cl. .................................. 43/1; 135/901
[58] Field of Search .............. 43/1; 135/87, 101, 102, 135/103, 104, 105, 106, 901, DIG. 9

[56] References Cited

U.S. PATENT DOCUMENTS

| | | | |
|---|---|---|---|
| 2,159,273 | 5/1939 | Killinger | 43/1 |
| 2,345,377 | 3/1944 | Bowen | 135/106 |
| 2,546,588 | 3/1951 | Ellis | 280/20 |
| 2,816,297 | 12/1957 | Stanley | 9/5 |
| 2,953,145 | 9/1960 | Moss et al. | 135/105 |
| 3,018,857 | 1/1962 | Parham | 189/2 |
| 3,540,170 | 11/1970 | Flowers | 43/1 |
| 3,609,905 | 10/1971 | Fuhrman et al. | 43/1 |
| 3,622,201 | 11/1971 | Radig | 297/217 |
| 3,642,318 | 2/1972 | Avant | 297/184 |
| 3,848,352 | 11/1974 | Sayles | 43/1 |
| 3,886,678 | 6/1975 | Caccamo | 43/1 |
| 3,902,264 | 9/1975 | Radig | 43/1 |
| 3,913,598 | 10/1975 | Gutting, Jr. et al. | 135/4 R |
| 4,091,584 | 5/1978 | Brown | 135/102 |
| 4,171,595 | 10/1979 | Tucker | 43/1 |
| 4,175,576 | 11/1979 | Iby | 135/106 |
| 4,186,507 | 2/1980 | Stinnett | 43/1 |
| 4,364,193 | 12/1982 | Visco | 43/1 |
| 4,682,436 | 7/1987 | Ritson | 43/1 |
| 4,716,919 | 1/1988 | Griffin | 135/901 |

Primary Examiner—M. Jordan
Attorney, Agent, or Firm—Robert W. Weig

[57] ABSTRACT

The disclosure is directed to a portable blind for hunting and other uses. The blind is light in weight, portable and durable and made of a lightweight frame and fabric. It contains a door so that users need not crawl under or step over a cross bar for entry and egress. A combination gun rest and drink holder and inside pockets are provided. A flip back top made of see through material is used so that 360 degrees of visibility and gun use are provided. Camouflage patches and brush holding loops are optional.

18 Claims, 4 Drawing Sheets

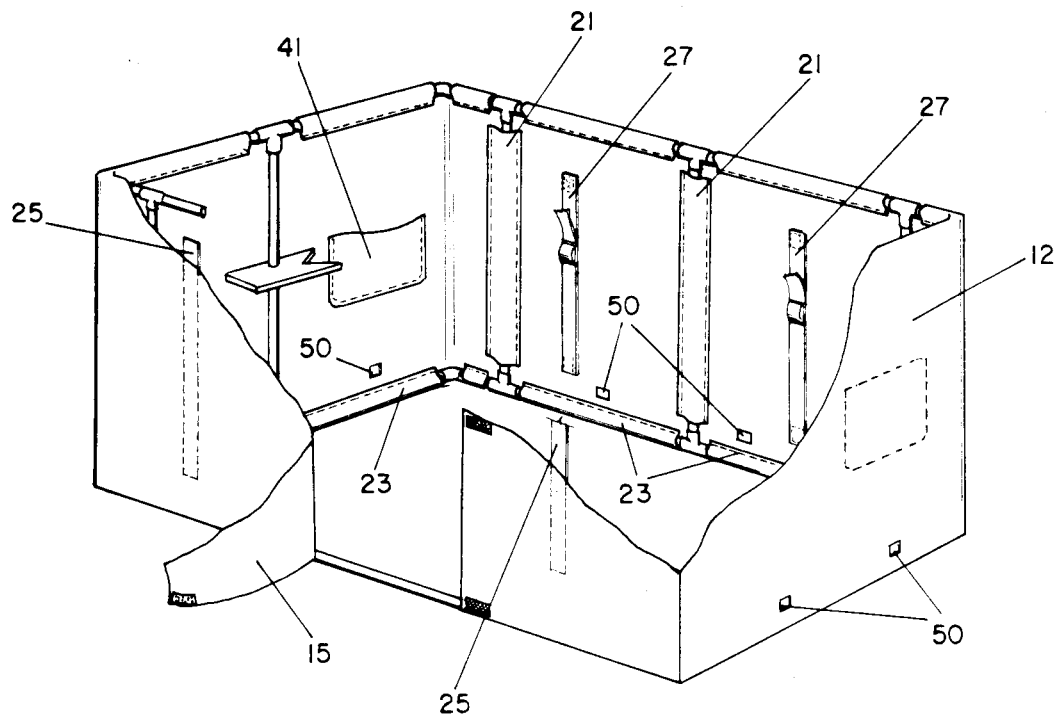
FIG—4
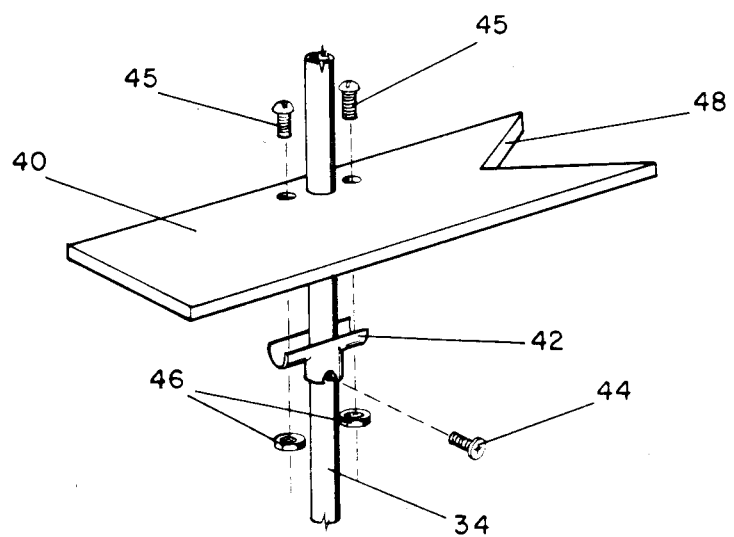
FIG—5

PORTABLE BLIND

FIELD OF THE INVENTION

The invention relates to blinds and more particularly to easily set up for use and collapsed for carrying portable game hunting and observing blinds.

BACKGROUND OF THE INVENTION

There has long existed a need for a readily carried, set up and collapsed blind which is lightweight, comfortable and effective in use, inexpensive to manufacture, long lasting, and easily cleaned and maintained. Over the years several portable blinds have been proposed and used. One such blind is that described in U.S. Pat. No. 3,018,857 to Parham. This patent shows a rather heavy blind constructed of sheet metal panels and an angle iron base. Although the blind is disclosed as being portable, it is clearly a heavy device, made of individually heavy component parts. Such a blind could not be carried far by an individual packing into a hunting area who typically must also carry a shotgun or rifle as well as other outdoor gear. Another blind is shown in U.S. Pat. No. 3,913,598 to Glutting, Jr. et al. This patent discloses a frame and fabric portable blind which is confining in size and inconvenient to use. Shooting is confined to window flap openings. Its top cover is not readily removed for shooting and a hunter has little view of the terrain or sky through the flap windows. U.S. Pats. Nos. 3,642,318 to Avant and 4,186,507 to Stinnett also show portable lightweight frame and fabric hunting blinds. The U.S. Pat. No. 3,642,318 blind has no top or cover and is therefore not very concealing for hunting waterfowl or other birds and provides no shelter from rain and snow. The U.S. Pat. No. 4,186,507 shows a blind with a cover, but the cover is visually limiting to blind users whose view is confined to that offered by openings in the walls.

It can therefore be seen that there exists a need for a truly portable, lightweight blind providing users effective camouflage and protection from the elements and good outward visibility of the sky and terrain. Such a blind should be inexpensive to manufacture, long lasting, simple and quick to assemble and disassembly on site without tools. It should be easy to clean and maintain. It should be comfortable and effective.

SUMMARY OF THE INVENTION

In accordance with the invention there is provided a portable blind comprising a closed perimeter base, a matching perimeter top containing an open portion, and a plurality of uprights disposed between the frame perimeter base and the frame perimeter top. A fabric cover is fittable over the frame, the cover comprising a door portion positionable over the open portion of the perimeter frame top so that a user can walk in and out through the door portion. The frame preferably comprises pieces of lightweight material which slip fit together, such as pvc pipe. A top pivotally attaches to the frame and is readily movable between an up and a down position to provide 360 degrees of use for the blind. The top is preferably see through and can comprise a frontal and side curtains. A top hold down element can be provided. The cover can comprise grommets for hold down stakes, means for removably attaching camouflage patches thereto, and a dog door. A floor portion can be attached to the blind and a combination gun and drink holder can be installed therein. Inside pockets and brush holders can be provided.

One object of the invention is to provide comfortable and effective camouflage from game and birds.

Another object of the present invention is to provide a portable blind easily carried to, assembled, and disassembled on site without tools.

One advantage of the present invention is that in accordance therewith, 360 degrees of visibility and gun use are provided.

Another advantage of the instant invention is that user comfort is afforded with easy access and egress, gun and drink supports and cover protection.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 4 is a cutaway showing of the preferred embodiment;

FIG. 5 depicts a combination gun rest and drink holder for use with the preferred embodiment.

DETAILED DESCRIPTION OF A PREFERRED EMBODIMENT OF THE INVENTION

Figure 1:
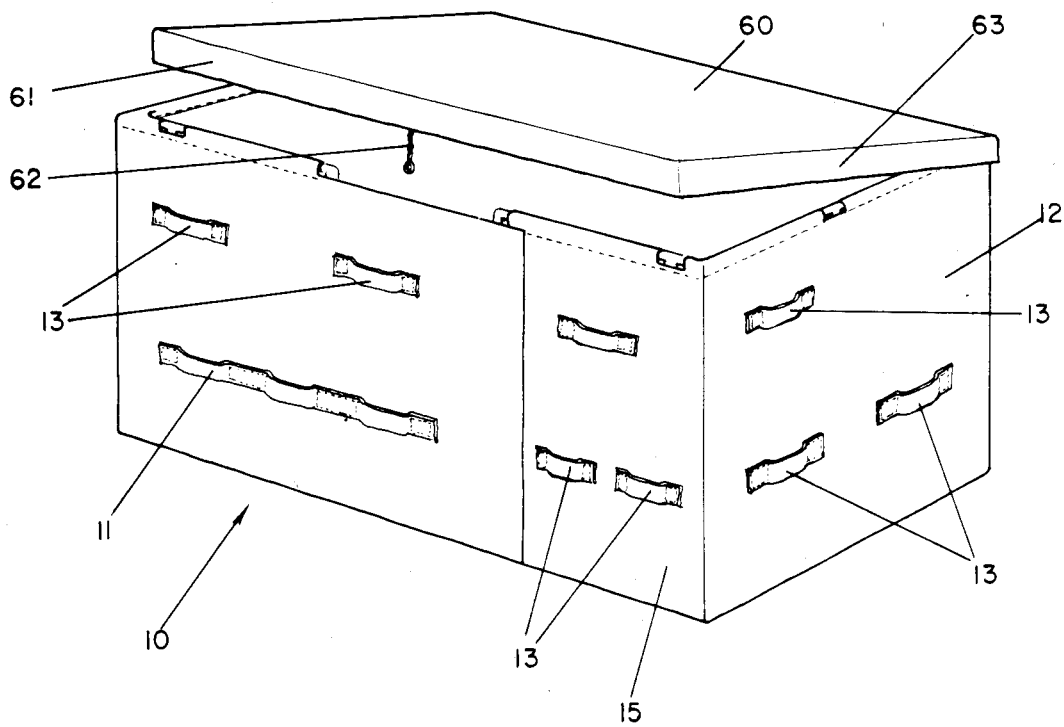
FIG. 1 illustrates a preferred embodiment of the invention in use as a blind with its top in its "up" osition.
Figure 3:
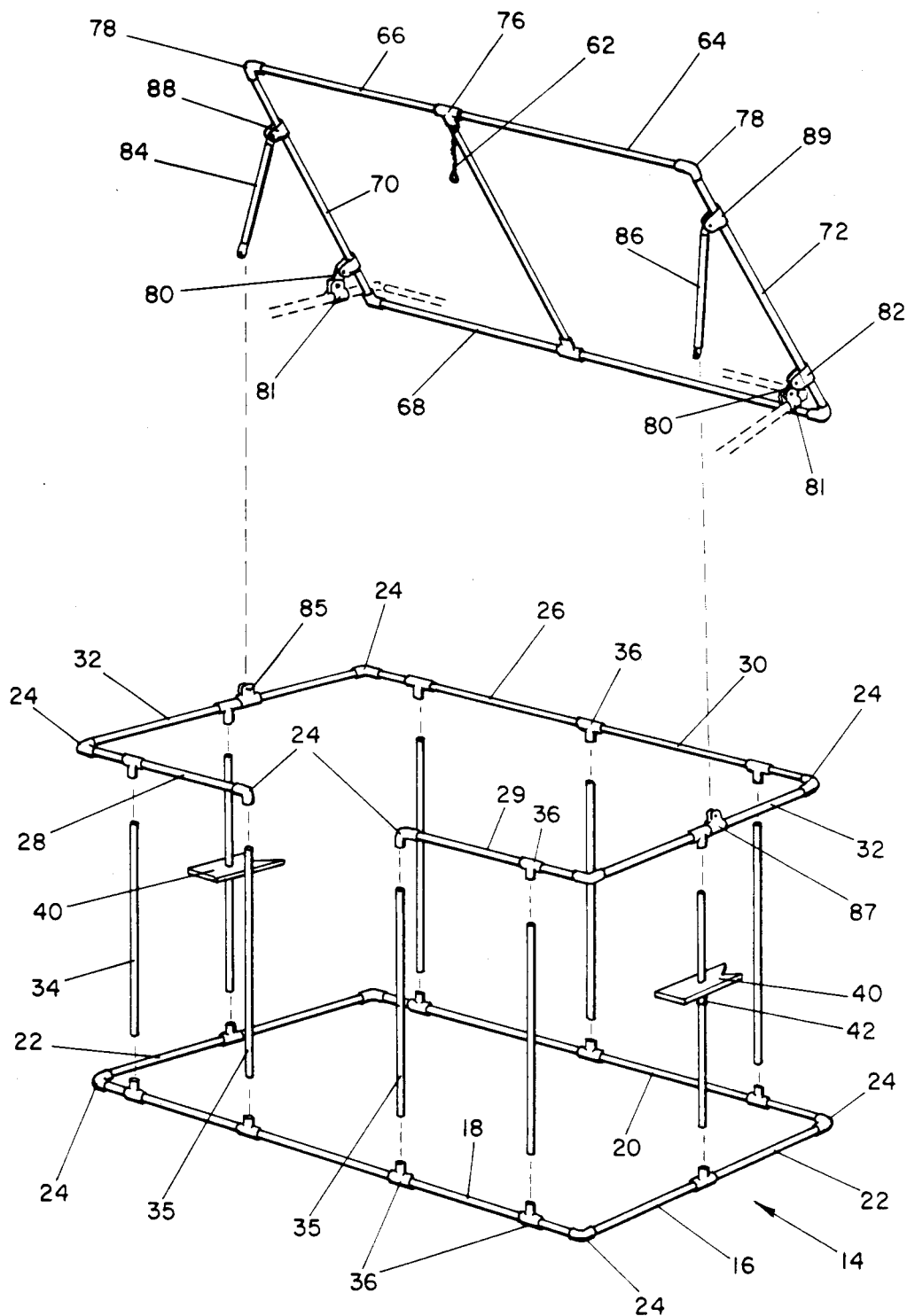
FIG. 3 is an exploded view of the frame of the preferred embodiment.

Reference is now made to FIG. 1 which illustrates a preferred embodiment of the invention 10 assembled for use. The blind comprises a cover 12 which comprises a flexible planar material, such as ripstop nylon, canvas, duck, plastic sheeting. The material used should be durable, wind and water resistant. It should preferably be relatively easy to clean. In addition, the material should be relatively light in weight to facilitate the desired portability of the blind. The cover 12 comprises a single unit stitched, riveted, glued, seam-welded or otherwise fastened together. A frame 14, best seen in an exploded view in FIG. 3, supports cover 12. The frame preferably comprises pieces of a lightweight, durable, inexpensive conduit, such as PVC pipe, aluminum conduit, or wooden dowels. The preferred embodiment described herein uses a PVC pipe frame and a ripstop nylon cover. The pieces of the frame preferably slip fit together, but may be threaded, notched, keyed or otherwise provided with suitable connectability to adequately hold the frame together in use. The blind, including the frame, is, designed for convenience of use, preferably capable of assembly and disassembly without tools of any kind, but if desired, a frame requiring a tool for assembly and disassembly could be used in practicing the invention.

Cover 12 can be provided with loops 11 for holding brush to camouflage the blind therewith. Too, the cover can comprise a single or various colors, and a camouflage pattern, if desired. Patches of camouflage fabric or other color fabric can be removably attachable to the cover using pieces of Velcro 13 or other fastening means to adapt the camouflage of the blind to various conditions. Thus, in snowy weather, white patches could be used. In green or desert areas, green or tan patches, as appropriate.

Frame 14 comprises a closed perimeter base 16 comprising front member 18, rear member 20 and side members 22. The front and rear members 18 and 20 join side members 22 at elbows 24. Frame 14 additionally comprises a perimeter top 26 made of front segments 28 and 29, rear members 30 and side members 32. Perimeter top 26 comprises an open portion between front segments 28 and 29 defining an access and egress door for a user. A plurality of interchangeable uprights 34 fittable into T-joints 36 disposed on the base and top members and front segments support frame top 26 over base 16. Two uprights 35 which are structurally the same as the other uprights 34 form the sides of the doorway in the frame. Elbows 24 connect the side members 32 to front segments 28 and 29 and rear member 30 as well as the front segments to doorway uprights 35. Those skilled in the art will appreciate that all parts shown in the frame can be slip fit or threadably engaged together and that parts of the frame can be preassembled, if desired, since the whole frame need not be taken apart for portability. For example, the members and segments can be preassembled and glued together in such a manner that a minimum number of slip-fits are required for assembly. Thus, the T-joints 36 are preferably glued in place on members and segments and elbows 24 are glued to one of two adjoining members or to one end of a segment, so as to be fittable into its adjoining member or into an upright for assembly.

FIG. 5 shows a combination gun rest and drink holder 40 fittable onto an upright 34. A support 42 for a holder 40 can be removably positioned on an upright 34 with a screw 44, pin, or the like, or fixed thereto with glue. For added stability screws 45 and nuts or other threaded elements 46 can be used to secure holder 40 to support 42. Notch 48 provides a reliable gun rest and the flat top of holder 40 will hold a mug or glass. Those skilled in the art will appreciate that an aperture for receiving a glass fittable therein can be provided in holder 40. A circular lip or other spill prevention device can also be employed on holder 40 in practicing the instant invention. A holder 40 can be provided on each side, or against the front or back of the blind, or in any manner desired by a user. Inside pockets 41 can also be affixed on the inside of cover 12 for the convenience of users.

Figure 2:
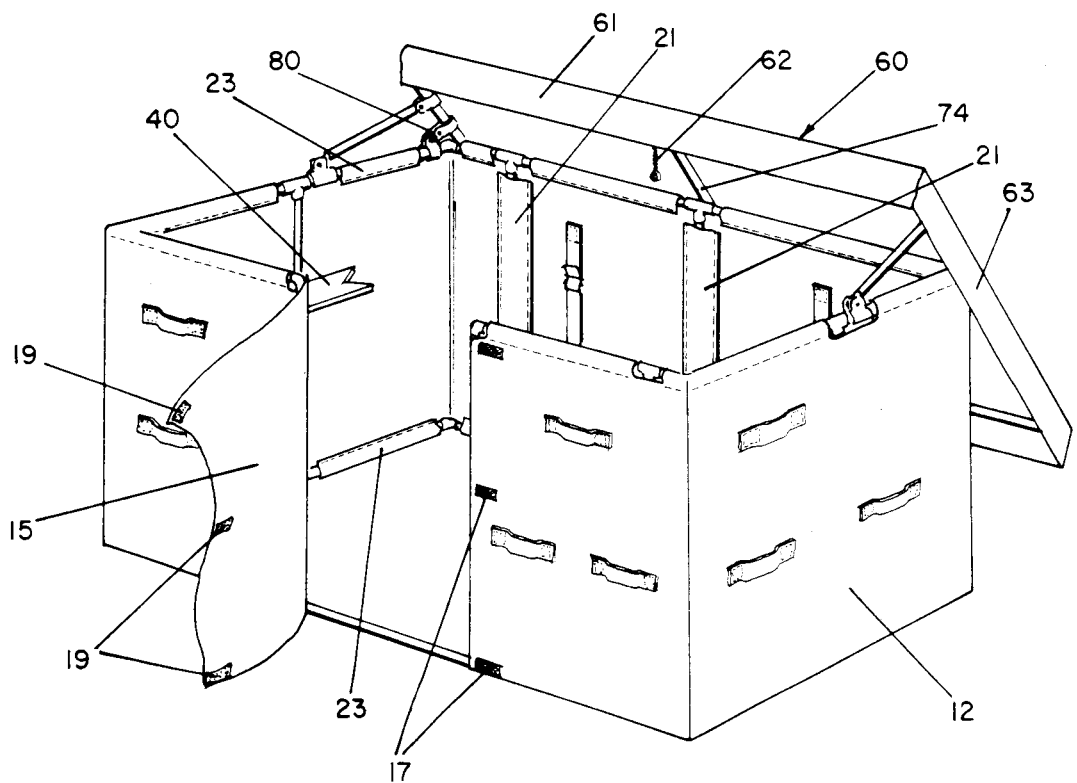
FIG. 2 shows the preferred embodiment with its top in its "down" position and its access and egress door open.

FIGS. 1, 2 and 4 show cover 12 in place on frame 14. A door portion 15 is provided, preferably with securing means such as Velcro fasteners 17 and 19 for easy access and egress by a user. Those practicing the art will realize that snaps, buttons, zippers and other such fastening means can be used, if desired, in lieu of Velcro. Thus, a user is able to enter and leave the blind without the need to step over or crawl under a cross bar. This is an important feature providing added user safety as well as comfort since the preferred embodiment of the invention is useful as a hunting blind and users carry shotguns and rifles into and out of the blind. The cover preferably employs vertical envelopes 21 for securing the cover to uprights 36 and horizontal envelopes 23 for securing the cover to the base and top of the frame. Because frame top 26 contains an open portion between its segments 28 and 29, vertical cover reinforcement and cinching straps 25 are provided affixed to cover 12 on both sides of door portion 15. Cover reinforcement and cinching straps 25 are a novel feature of the invention when used in combination with the open portion containing frame top, and substantially assist in providing the necessary stability for the blind to withstand wind and other forces. Additional vertical support straps 27 can be provided on the back and sides of the cover to further increase blind stability. Grommets 50 can be disposed in cover 50 near the frame base so that means such as stakes can be used to anchor the blind to the ground. Optionally, a floor can be provided and affixed to the cover with Velcro, snaps, or other fastening means.

Another unique feature of the invention is its readily positionable top 60 which can be easily moved by a user between its "up" position seen in FIG. 1 and its "down" position seen in FIG. 2. Typically a user, after entering the blind with the top in its down position will pull the top into its up position for use. A pull rope 62 can be fastened to the top to assist the user in moving the top from one to the other position. The pull rope is also useful for holding the top in its up position in windy weather. Top 60 comprises a frame 64 comprising front member 66, rear member 68, side members 70 and 72 and a central, top reinforcing member 74. Central member 74 is a preferred mount for pull rope 62. T-joints 76 and elbows 78 are used to complete the frame 64 of top 60. In the preferred embodiment illustrated, frame 64 of top 60 is swivelly mounted on frame 14 using sleeved hinges which are affixed to frame top side members 32 with sleeves 81. The sleeves 82 of hinges 80 slidably engage the side members 70 and 72 of the top 60. The top 60 pivots on hinges 80. A pair of top support members 84 and 86 rotatably attach to side members 32 with hinges 85 and 87. Top support members 84 and 86 rotatably attach to side members 70 and 72 of the top 60 with hinges 88 and 89. As the top 60 is raised from its down, FIG. 2 position, the sleeves 82 of hinges 80 slide back on side members 70 and 72 of top 60. As top 60 is lowered from its up, FIG. 1 position, sleeves 82 of hinges 80 slide forward on side members 70 and 72 of top 60. Those skilled in the art will recognize that other hinge configurations can be used in practicing the invention to raise and lower the top of the blind. With the top in its down position a hunter has a 360 degree arc in which to fire. The particular hinge structure described satisfies the need for a full, quick, quiet and easy top movement. Top 60 preferably comprises see-through material so that users have 360 degrees of visibility whether the top is up or down. Frontal and side curtains 61 and 63 are provided with the preferred embodiment and also comprises see-through material. Thus, users benefit from the camouflage of the top and its curtains, but have visibility through the material thereof in using the blind.

Figure 6:
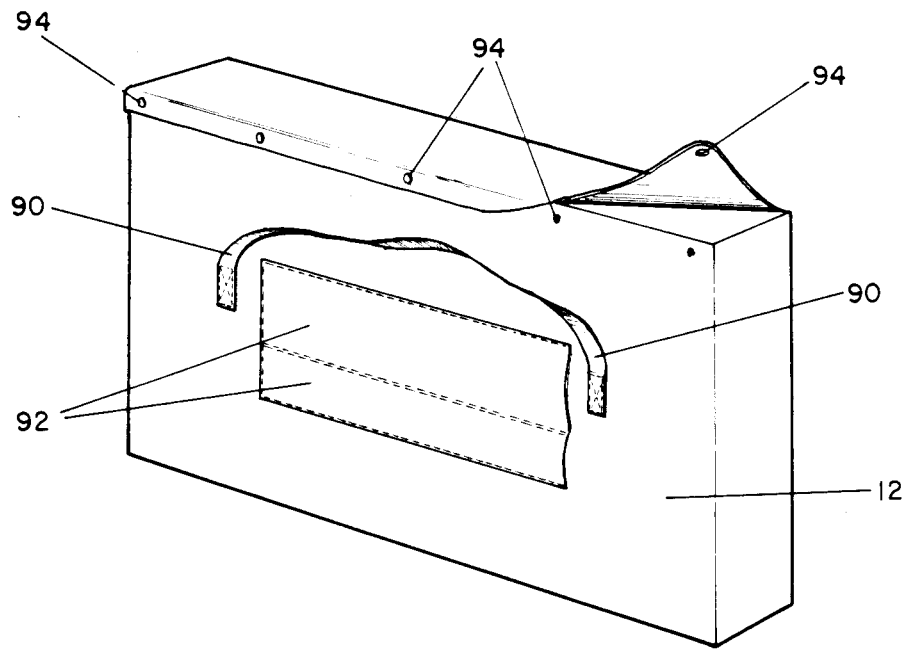
FIG. 6 shows the preferred embodiment in its carrying case for travel.

FIG. 6 shows the preferred embodiment folded and ready to be carried by a user. The two person blind of the preferred embodiment weighs only a few pounds and reduces to a convenient carrying size. A carrying strap 90 and upright pockets 92 can be provided. The cover 12 forms the carrying case. The size of the collapsed blind depends on the size of the frame perimeter. To collapse the blind for carrying, the uprights 34 and 35 are removed, the cover 12 is removed from frame 14, and the frame 64 of top 60, the frame base 16, and the frame top 26 of the frame 14 are placed on top of one another. The cover is used to wrap the base 16, top 26, and frame 64. Snaps 94 or other fastening means are used to hold the package together. Uprights are placed in pockets 92.

The invention has been described in detail with particular reference to a preferred embodiment thereof, but it will be understood that variations and modifications can be effected within the scope of the invention.

What is claimed is:

1. A portable blind comprising:
    a frame comprising a closed perimeter base, a matching perimeter top having an open portion therein, and a plurality of uprights disposed between said frame perimeter base and said frame perimeter top;
    a fabric cover fittable on said frame, said frame and said cover forming a stable structure, said cover comprising a door portion positionable over said open portion of said perimeter top whereby user ingress into said blind and egress out of said blind is accomplishable through said door portion of said cover and said open portion of said frame perimeter top; and
    a pair of cinching straps disposed on said fabric cover, one said strap being positioned on each side of and adjacent to said door portion of said fabric cover, said straps extending vertically essentially between said top and base frame perimeters when said cover is in place on said frame, said cinching straps being adjustably tightenable to provide additional stability to said blind.

2. The invention of claim 1 wherein said frame comprises pieces which are slip fit together.

3. The invention of claim 1 wherein said frame comprises lightweight material.

4. The invention of claim 1 wherein said frame comprises PVC pipe.

5. The invention of claim 1 further comprising a top pivotally attachable to said frame, said top being readily movable by a user between an up position where said top is spaced above said top perimeter of said frame and a down position where said top is swung back out of the way of a user to provide 360 degree use of said blind.

6. The invention of claim 5 wherein said top is a see through top.

7. The invention of claim 7 wherein said top comprises side curtains.

8. The invention of claim 5 wherein said top comprises a frontal curtain.

9. The invention of claim 5 wherein said top comprises a user held hold down element.

10. The invention of claim 1 wherein said cover further comprises stake grommets for staking said blind to the ground.

11. The invention of claim 1 wherein said cover comprises means for removably affixing camouflage patches thereto.

12. The invention of claim 1 wherein said door portion further comprises a dog door.

13. The invention of claim 1 further comprising a floor portion attachable to said blind.

14. The invention of claim 1 further comprising a detachable combination drink and gun holder.

15. The invention of claim 1 wherein said cover comprises inside pockets.

16. The invention of claim 1 wherein said cover comprises means for affixing brush thereto to further camouflage said blind.

17. The invention of claim 1 further comprising a plurality of vertically disposed upright envelopes disposed on said fabric cover to position and retain said cover on said frame.

18. The invention of claim 17 further comprising additional vertically disposed cover cinching straps disposed between some of said vertically disposed upright envelopes.

* * * * *